G. W. DUNHAM.
PRIMING SYSTEM FOR INTERNAL COMBUSTION ENGINES.
APPLICATION FILED OCT. 5, 1912.
1,133,011.
Patented Mar. 23, 1915.
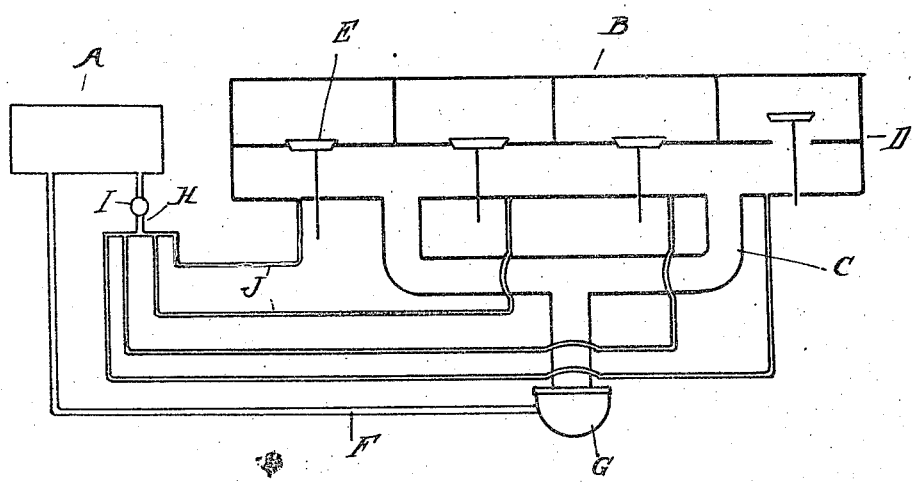
Witnesses
Inventor
George W. Dunham
By Whittemore Hulbert & Whittemore
Attys

UNITED STATES PATENT OFFICE.

GEORGE W. DUNHAM, OF DETROIT, MICHIGAN, ASSIGNOR TO CHALMERS MOTOR COMPANY, OF DETROIT, MICHIGAN, A CORPORATION OF MICHIGAN.

PRIMING SYSTEM FOR INTERNAL-COMBUSTION ENGINES.

1,133,011.   Specification of Letters Patent.   Patented Mar. 23, 1915.

Application filed October 5, 1912. Serial No. 724,116.

*To all whom it may concern:*

Be it known that I, GEORGE W. DUNHAM, a citizen of the United States of America, residing at Detroit, in the county of Wayne and State of Michigan, have invented certain new and useful Improvements in Priming Systems for Internal-Combustion Engines, of which the following is a specification, reference being had therein to the accompanying drawings.

In the present state of the art, it is usual to provide explosion engines with a fuel supply tank in which the liquid fuel is under pressure, and from which it is fed to the carbureter. It is also usual to provide the various cylinders of the engine with priming cups, which are filled with the liquid fuel from a different source and are connected with the interior of the cylinders by passages controlled by individual valves.

It is the object of the present invention to automatically supply the liquid fuel to the primers from the pressure tank, and at the same time to avoid the use of the separate priming cups and their valves, thereby diminishing the danger of leakage. This I have accomplished by providing fuel conduits leading to the valve chambers of the several cylinders and discharging adjacent to the valves outside of the cylinder. Thus no opening into the cylinder other than the inlet passage for the fuel charge is necessary, and at the same time the liquid fuel discharged by the conduit will be swept into the cylinder by the indrawn air current whenever the valve is open. These several fuel supply conduits are connected to the pressure tank, preferably by a common conduit with a single controlling valve—so that by manipulating this valve all of the cylinders are simultaneously primed.

In detail, and as shown in the drawing—which is a diagrammatic representation of a multi-cylinder engine, to which my priming system is applied—A is the fuel supply tank in which the liquid is under pressure; B is a multi-cylinder engine; C the induction conduit therefor; D the separate valve chambers, connected to said conduit and controlled by the valves E; F is the supply connection from the tank A to the carbureter G for the induction conduit; and H is a separate fuel conduit connected with the tank A and controlled by the valve I. This conduit is provided with a plurality of branches J leading to the several valve chambers and having their discharge ends adjacent to the valves E but outside of the cylinder.

In operation, whenever it is desired to prime the engine the valve or pet cock I is opened to discharge a small quantity of the liquid fuel into each of the valve chambers, where upon the turning over of the engine this fuel will be drawn into the engine cylinders. The system is particularly adapted for use in connection with automatic engine starters.

What I claim as my invention is:

The combination with a tank for liquid fuel under pressure, of a multi-cylinder engine supplied from said tank, a separate connection with said tank, a single controlling valve therefor, and valveless conduits leading from said connection beyond said controlling valve, and discharging in the valve-chests of the several cylinders immediately adjacent to each of the valves and outside the cylinders, said valveless conduits being independent of the means for normally supplying said engine.

In testimony whereof I affix my signature in presence of two witnesses.

GEORGE W. DUNHAM.

Witnesses:
C. E. GREGORY,
E. G. PANDOW.